United States Patent [19]
Jutras

[11] Patent Number: 5,729,215
[45] Date of Patent: Mar. 17, 1998

[54] BATTERY OPERATED SAFETY STROBE BARRICADE

[76] Inventor: Richard A. Jutras, 17 Autumn Pond Park, Greenland, N.H. 03840

[21] Appl. No.: 695,979

[22] Filed: Aug. 15, 1996

[51] Int. Cl.[6] .................... B60Q 7/00; E01F 9/00; G08G 1/00
[52] U.S. Cl. .................... 340/908.1; 340/908; 256/64; 116/63 P; 182/153
[58] Field of Search .................... 340/908.1, 908, 340/331; 256/64; 248/166, 170, 465; 182/153; 40/610, 606; 362/186; 116/63 P

[56] References Cited

U.S. PATENT DOCUMENTS

| | | | |
|---|---|---|---|
| 2,486,655 | 11/1949 | Wilson et al. | 340/908 |
| 2,838,744 | 6/1958 | De Wald | 340/908.1 |
| 3,687,419 | 8/1972 | Forestal | 256/64 |
| 4,085,762 | 4/1978 | O'Brian et al. | 182/153 |
| 4,977,697 | 12/1990 | Genick | 40/606 |
| 5,003,912 | 4/1991 | Thurston | 256/64 |
| 5,382,112 | 1/1995 | Fu | 116/63 P |
| 5,521,595 | 5/1996 | Totten et al. | 340/908 |

*Primary Examiner*—Thomas Mullen
*Assistant Examiner*—John Tweel, Jr.
*Attorney, Agent, or Firm*—William B. Ritchie

[57] ABSTRACT

A battery operated safety strobe barricade, particularly suited for school crossings. The use of a battery pack that is rechargeable and can be separated from the barricade enables the apparatus to be particularly well suited to safety situations where high visibility and weight are considerations. The A-frame stand section is fabricated from low weight aluminum so that it can be carried by even the smallest crossing guard. The rechargeable battery pack features a dual rate charger so that the unit can be left to charge continuously. The battery pack has a low voltage disconnect feature so that catastrophic battery discharge is avoided thus prolonging the life of the battery. A high visibility strobe light mounted on a telescoping pipe enables the unit, despite its light weight construction, to provide a warning beacon that can be easily seen at great distances, even in the daylight.

13 Claims, 7 Drawing Sheets

BATTERY OPERATED SAFETY STROBE BARRICADE

BACKGROUND OF THE INVENTION

1. Field of the Invention

The invention relates to barricades for warning approaching vehicles of hazardous conditions, particularly for use to warn vehicular traffic when pedestrians are within a dangerous zone relative to their direction of travel.

2. Description of the Related Art

The use of highway barricades, in particular, those having an A-frame shape, are well known in the art. Variations of this type of barricade have been used for more than forty years. The typical unit has a saw-horse configuration, that is, a pair of spaced apart legs, pivotally joined near the top, with each pair connected by cross-member panels which can also serve to display a warning sign. Various types of incandescent warning lights have frequently been incorporated into the design. When the legs of each pair are spread open, the unit becomes self-standing.

Representative of this genre is U.S. Pat. No. 3,015,804, issued to Nunn on Jan. 2, 1962. Nunn discloses a combined barricade and flashing light signal. In addition to the above general characteristics, Nunn discloses the use of a battery powered incandescent flashing light signal. Nunn discloses that the important consideration is that the battery and the flasher mechanism are housed within a strong metal cabinet. The heavy battery is free to swing so that the light will flash level even if the ground is not level. Due to the weight of this unit, it is not designed to be easily moved from location to location by people such as female crossing guards.

U.S. Pat. No. 3,092,826, issued to Klinger on Apr. 21, 1985, discloses another variation of this type of barricade. This device features the use of two warning lights positioned above each spaced apart pair of legs. As before, a heavy battery is made part of the structure and only incandescent lamps may be used which severely limit the effective range of the light warning.

Still another design is disclosed in U.S. Pat. No. 3,221,300, issued to Elledge on Nov. 30, 1965. This particular variation, recognizing the limitations of prior flashing units, concentrates on improving the flasher. Plastic lenses are used to improve the quality of light transmission. However, as before, the battery is made part of the warning structure and the device is limited to the use of incandescent bulbs.

In U.S. Pat. No. 4,859,983, issued to Kulp et al. on Aug. 22, 1989, still another A-frame type of barricade was disclosed, only this one is made from plastic. A storage compartment is provided to enable the user to increase the weight so that the device is stable in high winds. An incandescent warning light is bolted to the top cross member. As before, the ability of this device to provide a distant warning is limited by the use of an incandescent bulb.

Of general interest to the application are: U.S. Pat. No. 2,648,761, issued to Shamel on Aug. 11, 1953 which discloses a method to secure a light to an A-frame type of barricade; U.S. Pat. No. 3,691,526, issued to Huntington on Sep. 12, 1972, which discloses the use of thin straps to hinge the legs of the A-frame together; and U.S. Pat. No. 2,719,506, issued to Sequira on Oct. 4, 1955, which discloses an A-frame type of design that is to be used with a standard flashlight.

There is not found in the prior art a battery operated safety strobe light utilizing an A-flame type of construction that can easily be transported with the battery section separate from the A-frame and light, that has a rechargeable capability, a low voltage disconnect that prevents the battery from being overly discharged, a circuit breaker to protect the low voltage disconnect board, a voltage meter indicating the charge condition of the battery, and has a telescoping capability that allows the light to be placed higher than the A-frame cross-member.

SUMMARY OF THE INVENTION

It is an aspect of the invention to provide a battery operated safety strobe barricade that utilizes the warning capabilities of a strobe light.

It is an aspect of the invention to provide a battery operated safety strobe barricade that is sufficiently light weight so that it can be carried by an operator from one location to another.

Another aspect of the invention is to provide a battery operated safety strobe barricade that provides at least twenty-four hours of service without recharging the battery.

It is still another aspect of the invention to provide a battery operated safety strobe barricade that has a power pack that is easily disconnected from the strobe light and carried separately.

Another aspect of the invention is to provide a battery operated safety strobe barricade that has a low voltage disconnect feature so that the rechargeable battery will not be completely discharged, thereby prolonging battery life.

It is an aspect of the invention to provide a battery operated safety strobe barricade that can be stored for months, yet the battery will still be available for immediate use.

Another aspect of the invention is to provide a battery operated safety strobe barricade that employs a power pack that utilizes a dual rate charger; that measures battery voltage and adjusts its charge accordingly; and, is safe from being overcharged even when plugged in for months.

Another aspect of the invention is to provide a battery operated safety strobe barricade that has a battery with a pack case that is substantially water resistant and has a handle for comfortable carrying.

It is still another aspect of the invention to provide a battery operated safety strobe barricade that has a strobe light on top of a telescoping pole that will permit the strobe to be positioned higher than the top cross-member of the A-frame, thereby improving visibility.

Finally, it is an aspect of the invention to provide a battery operated strobe barricade that, due to its mobility, low cost, and effectiveness, will be used in situations where strobe warning lights are desirable such as protecting children at school crossings and other school functions, surveyors, emergency situations, road constructions sites, etc. but have not been previously used due to the unsuitability of prior art designs.

The invention is a barricade for providing a warning that a potentially hazardous condition is present. The invention comprises two major components: a stand and a battery pack. The stand comprises a substantially rectangular top shelf having four corners. Four substantially identical legs are provided, wherein each leg is pivotally attached to one of said corners of said shelf. A foldable shelf having an open position and a closed position is provided. Said foldable shelf further has two substantially identical sections connected by a hinge. Said foldable shelf is pivotally connected to said legs. When said shelf is in the open position, said stand is self-supporting in an A-frame type of configuration.

When said shelf is in the closed position, said stand may be transported to another location. A strobe light having an electrical connection is provided. Said strobe light is affixed to said top shelf of said stand. A sign is provided. Said sign is rigidly connected to one pair of legs of said stand. A battery pack is provided that is connectable to said stand via an electrical connection. Said battery pack comprises a lead acid battery capable of storing an electrical charge, said battery adapted for providing electrical power to said strobe light. A battery charger is provided that is connected to said battery for recharging said battery once battery has been discharged from supplying electrical power to said strobe light. An outlet for providing electrical power from said battery to said strobe light via the electrical connection of said strobe light is provided. A low voltage disconnect board connected between said outlet and said battery is provided. Said disconnect board disconnects said battery from said outlet if the voltage of said battery drops below a predetermined value. When said stand is in the open position and said battery pack is electrically connected to said strobe light via the electrical connection connected to said outlet, said sign is capable of displaying a warning message and said strobe light is able to provide a flashing warning light at substantial distances, thus enabling said barricade to provide the warning that the potentially hazardous condition is present. When said stand is in the closed position and said battery pack is disconnected from said outlet, said stand and said battery pack can be separately transported to a new location.

DETAILED DESCRIPTION OF THE INVENTION

Figure 1:
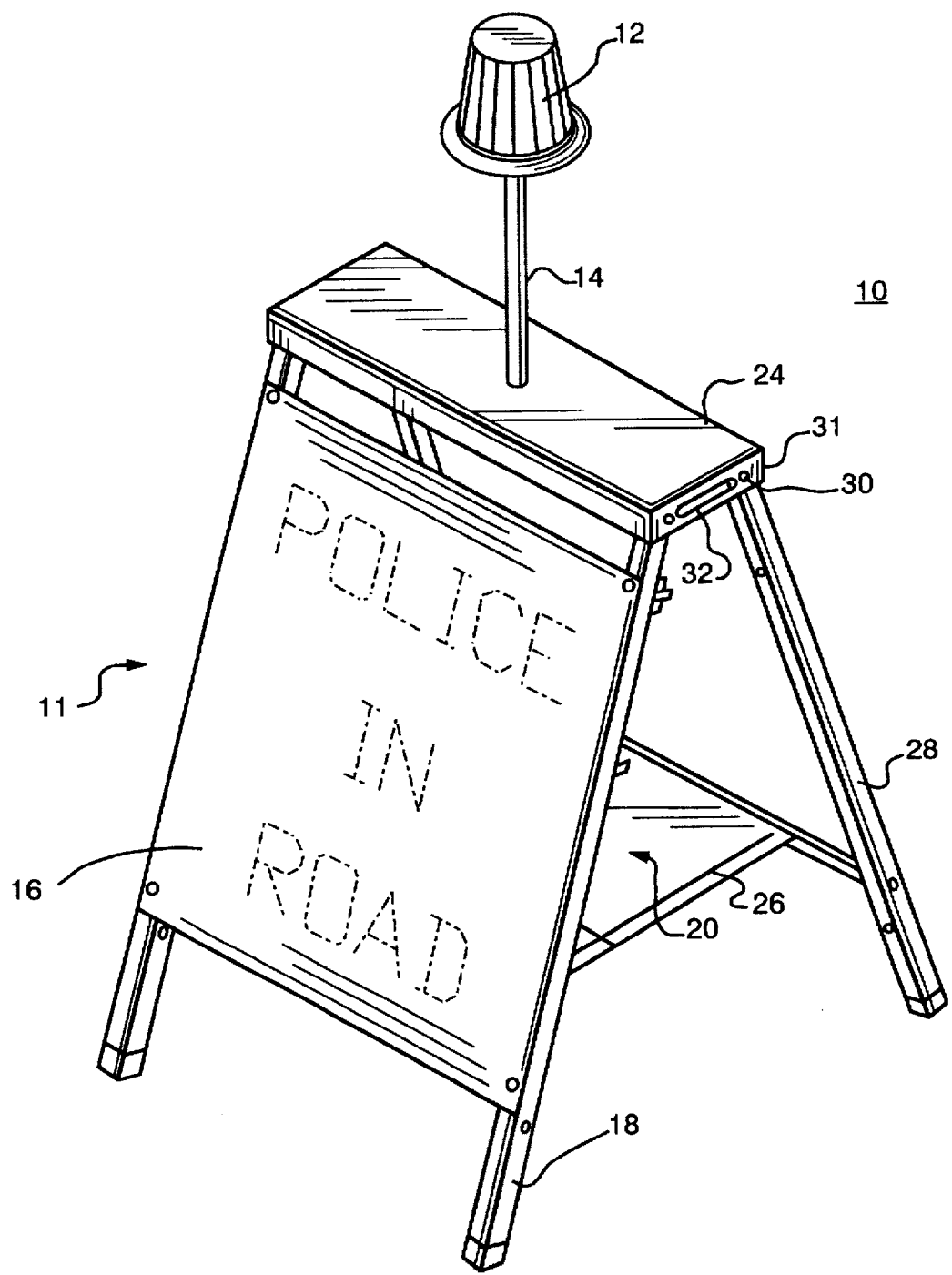
FIG. 1 is an isometric view of the preferred embodiment of the invention with the strobe light in its telescoped position.
Figure 2:
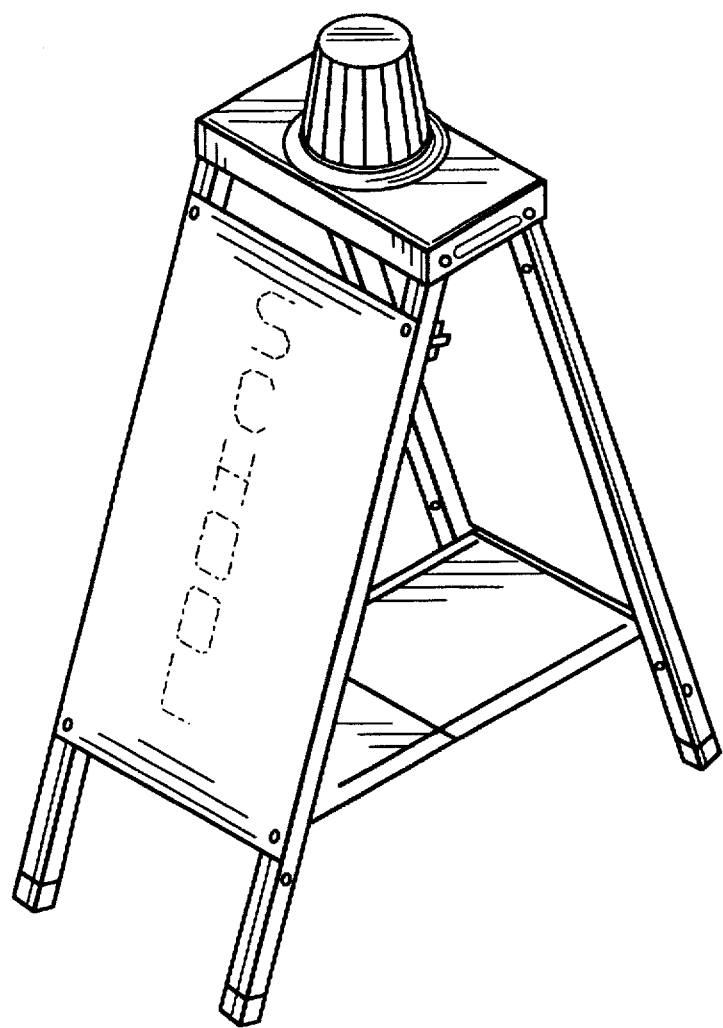
FIG. 2 is an isometric view of an alternative embodiment of the invention with the strobe light in its flush mounted position.

The invention 10 is a battery operated safety strobe barricade that is designed to protect anyone who may be in the zone of danger. The powerful strobe light 12 enables approaching vehicles to be forewarned that the vehicle is nearing a dangerous zone, that is, a region where individuals may be in the vehicle's direct path of travel. It is expected that invention 10 will be produced in at least two sizes, a 22 inch wide version and a 13 inch wide version (shown in FIG. 2). Both versions are virtually identical excepting the width. The narrower version is particularly well suited for school crossings and the like. The typical school crossing guard is female or an elderly male where the lighter weight and smaller size will be an advantage.

Figure 6:
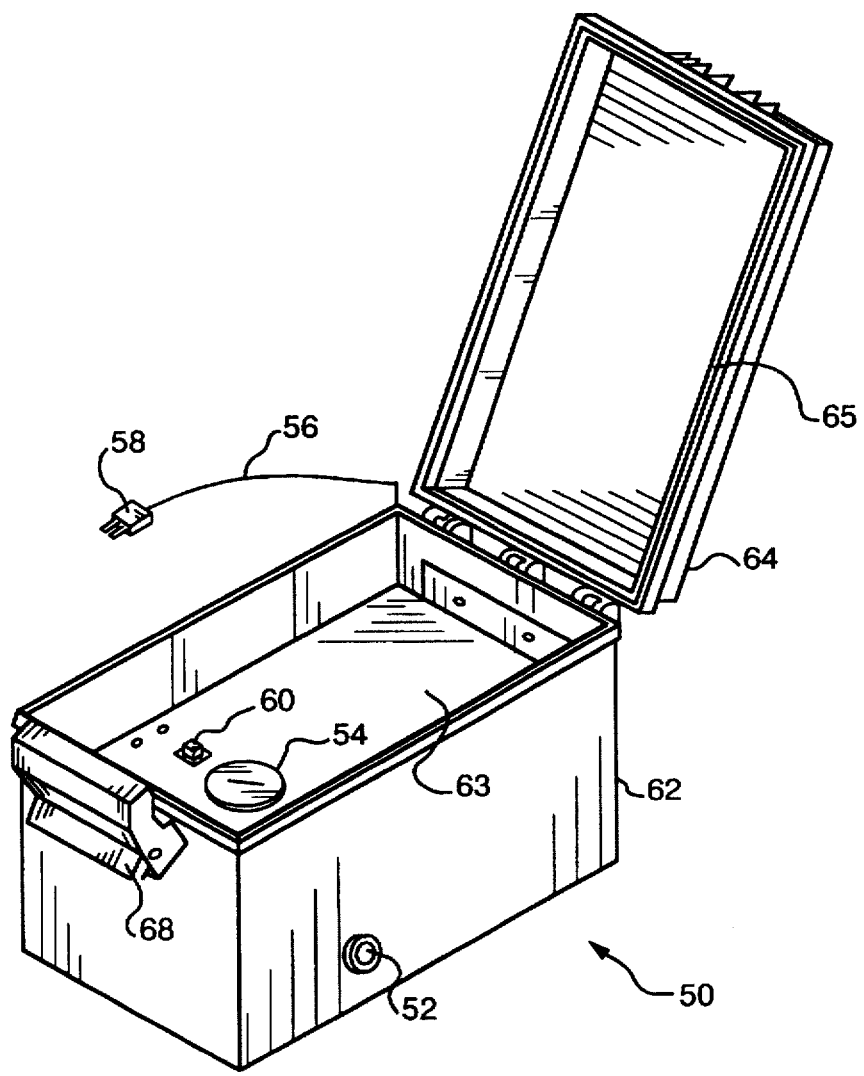
FIG. 6 is an isometric view of the battery pack.
Figure 7:
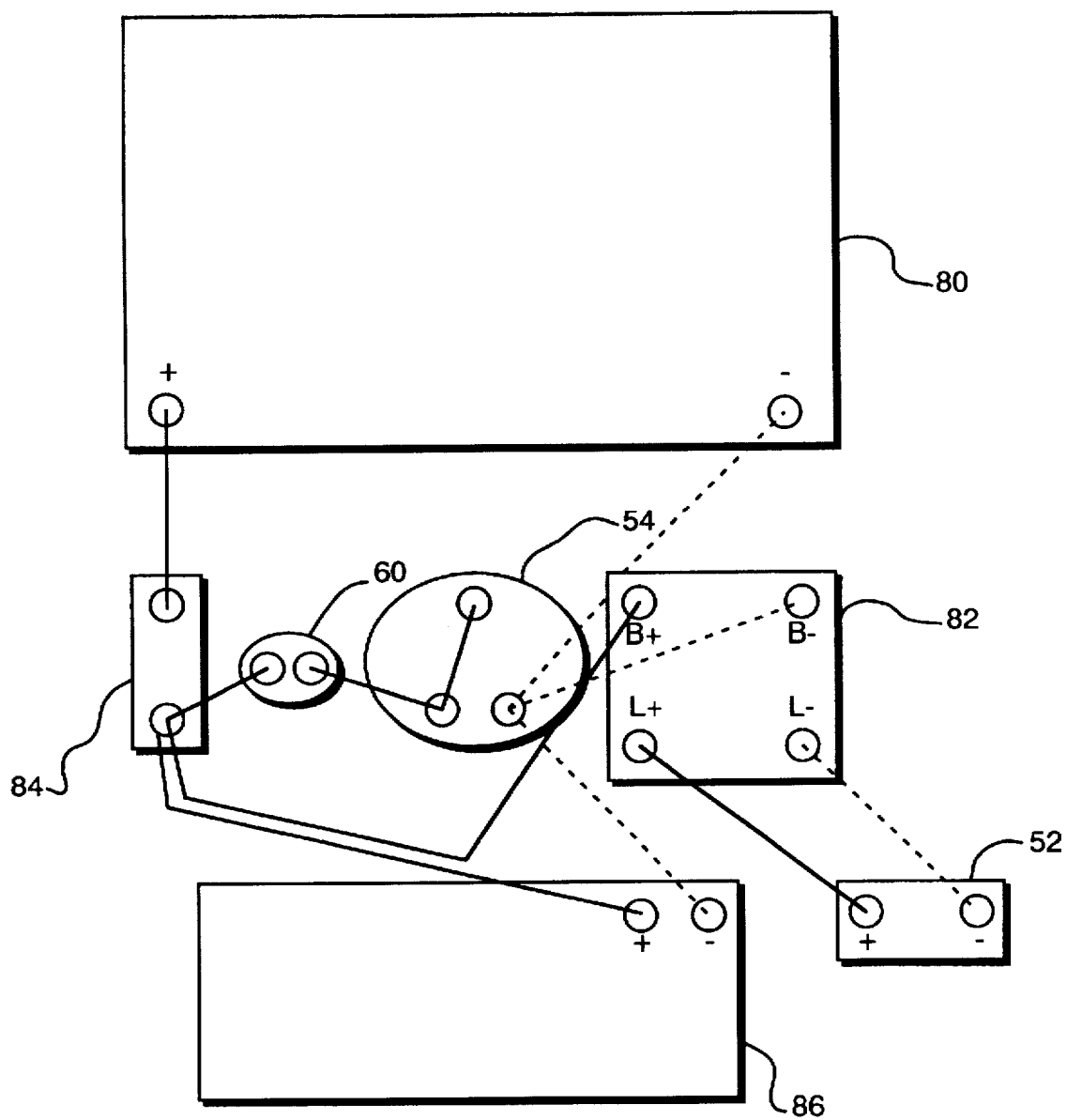
FIG. 7 is a block diagram of the battery pack circuitry.

The invention 10 has two major parts: the stand 11 which includes strobe light 12 and battery pack 50 (shown in FIGS. 6 and 7). Stand 11 is made up of five major parts: top shelf 24, legs 18, legs 28, lower hinge shelf 20 and signs 16.

Top shelf 24 is preferably made from 1/16 inch rectangular aluminum sheet. For the larger version, the size should be approximately 24¼ inches by 8⅞ inches and, for the smaller version, the size should be approximately 15¼ inches by 8⅞ inches. All four sides of the rectangle are bent approximately 1⅛ inches from the end, thus forming a "box" that is open at the bottom. If the unit is to be flush mounted, then a 1¼ inch hole (not shown) is centered in the top with three or more mounting holes surrounding it.

On end sections 31, two 5/16 inch holes are provided through which bolts 30 are attached. Hand grasp 32 is preferably an opening that is provided about 1½ inches from each end, ¼ inches from the top, and ¾ inches from the bottom of end section 31. Hand grasp 32 is used to carry stand 11.

Figure 3:
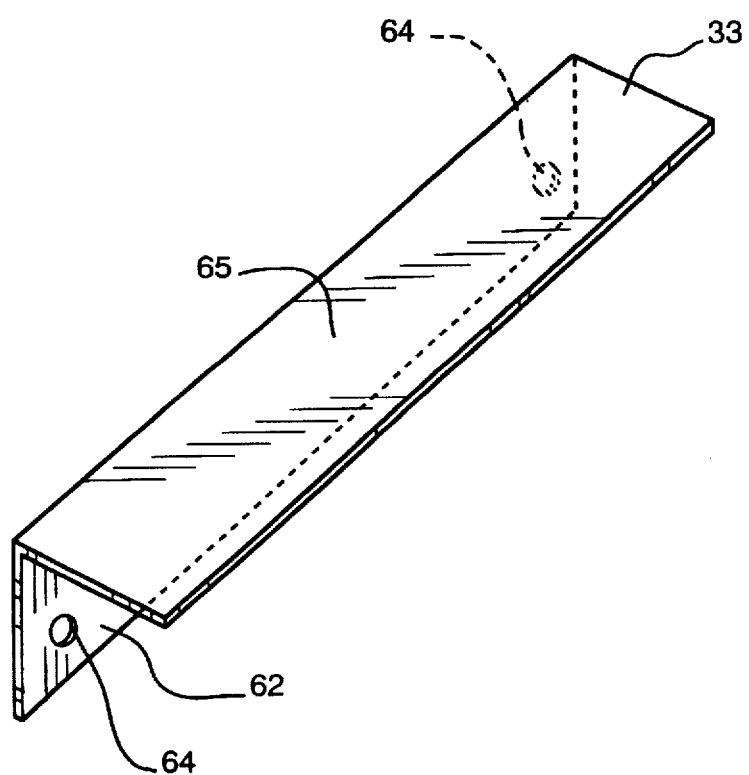
FIG. 3 is a detailed view of a support piece used to bolt the legs of the stand into position.

The underside of L-shaped anchoring sections 33 (shown in FIG. 3) are provided. The length matches the width of top shelf 24 after it has been bent to form the "box", that is, approximately 6½ inches long. Both legs 62 and 65 are preferably about 1⅜ inches long. Two holes 64, each being 5/16 inches in diameter are provided to line up with bolts 30. Anchoring sections 33 are preferably welded to the underside of top shelf 24.

Figure 4:
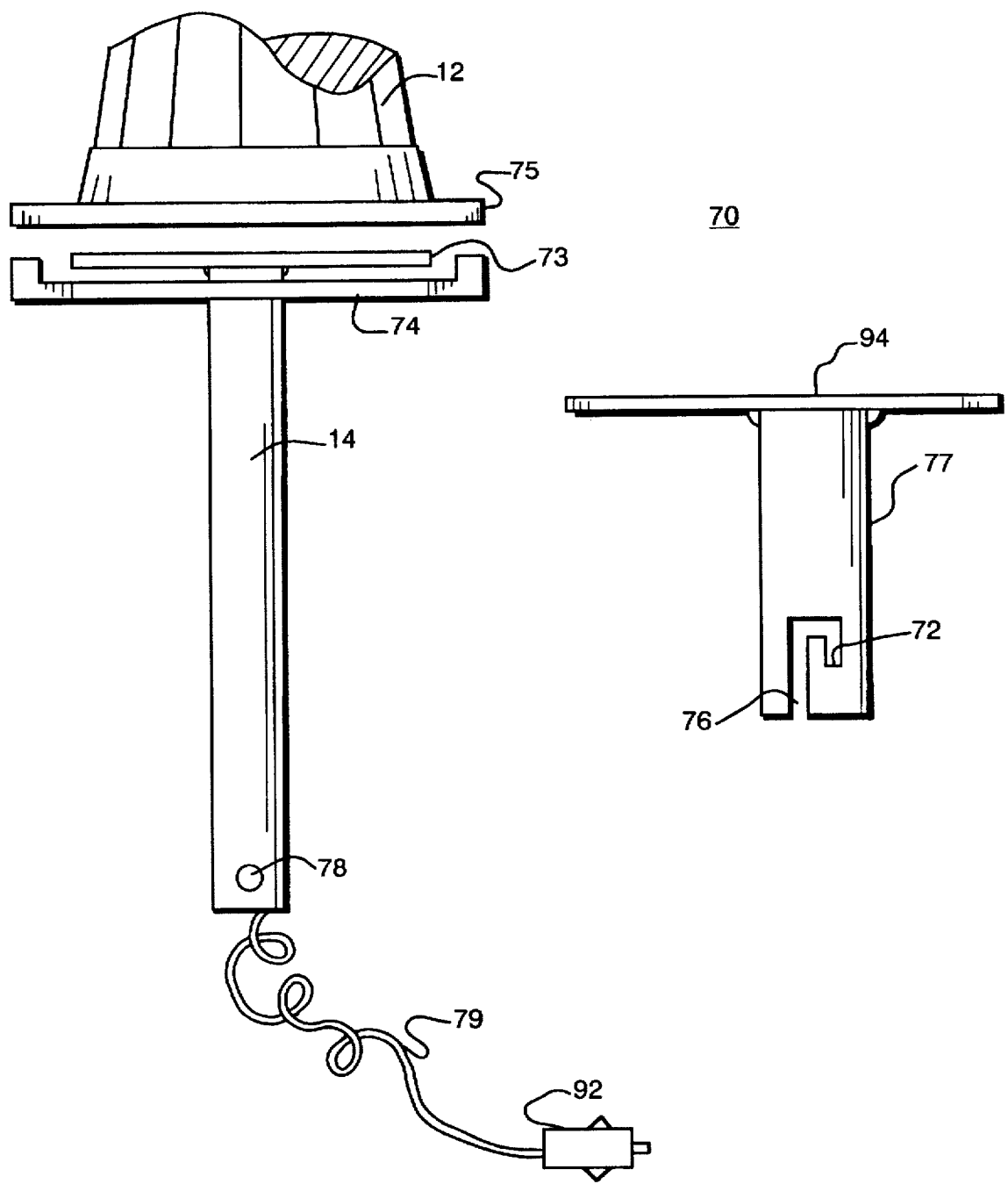
FIG. 4 is a detailed view of the telescopic assembly for the strobe light.

In the preferred embodiment, the telescoping variation, the center hole in top shelf 24 is made ⅞ inches in diameter rather than 1¼ inches. Referring now to FIG. 4, telescope assembly 70 will be described. Pipe 14 is preferably a ¾ inch by 16½ inch aluminum pipe having a 1/16 inch wall thickness. Pipe 14 is attached to strobe 12 so that strobe 12 can be raised above the surface of top shelf 24 for better visibility.

Since strobe 12 is being used in an outside environment under all kinds of weather conditions, it must be temperature-resistant and sealed against entry of dirt, water or dust. Further, it must be resistant to damage by shock or vibration. Strobe 12 is preferably a PULSATOR Model 551 as manufactured by Target Tech of Kent, Wash. 98032. This particular model can be mounted either flush or as a pipe mount. When mounted in a telescope version, the flange plate provided by the manufacturer is not used. Plate 73 is substituted which is preferably a 3½ inch square aluminum plate having a thickness of about 0.063 inches. Pipe 14 is preferably welded to plate 73. Plate 73 is then bolted between lower strobe plate 74 and upper strobe plate 75 via four 10/32 bolts. Plug 78 is inserted into a hole provided in the lower end of pipe 14. This part of the assembly is completed by feeding power cable 79 and attached plug 92 through pipe 14.

Telescope assembly 70 is completed using pipe 77 which is welded to the bottom side of top self 24. As noted above, hole 94 is a ¾ inch opening centered in top shelf 24. Pipe 77 is centered under this ¾ inch opening. Pipe 77 is preferably a ⅞ inch aluminum pipe about 4 inches long. A milled slot 76 is provided that has a width that corresponds to the diameter of plug 78. Pipe 14, power cable 79 and attached plug 92 are then fed through hole 94, and through pipe 77. To raise pipe 14 to its uppermost position, a user will merely pull up strobe 12 until plug 78 engages slot 76, wherein plug 78 is placed into position 72, and strobe 12 is held in its uppermost position. To lower, a user merely pulls up strobe 12 slightly while turning strobe about a quarter turn so that strobe 12 can be lowered down substantially flush with top shelf 24.

All four legs are constructed from 1 inch square aluminum stock having ⅛ inch walls. Preferably legs 18 and 28 are about 35½ inches long. Holes are provided near the top so that legs 18 and 28 can be bolted via bolts 30. Hinged bottom shelf (discussed in detail in FIG. 5) is attached via ⅜ inch holes that are provided in legs 18 and 28 about 7¼ inches from the bottom of the legs. Sign 16 which is preferably a rectangular sheet of aluminum on which various warning or caution indicia can be placed, such as the word "SCHOOL", or the word "CAUTION", etc. Sign 16 is bolted to legs 18 via ¹⁹⁄₃₂ bolts.

Figure 5A:
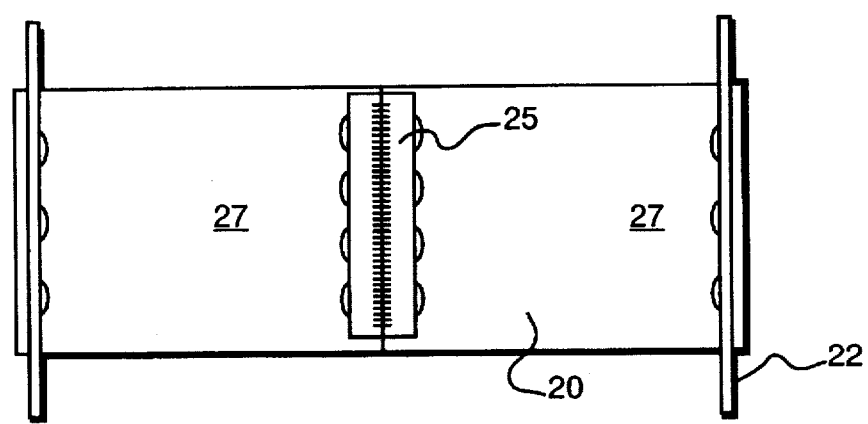
FIGS. 5A–5c are detailed views of the hinged bottom shelf.
Figure 5B:
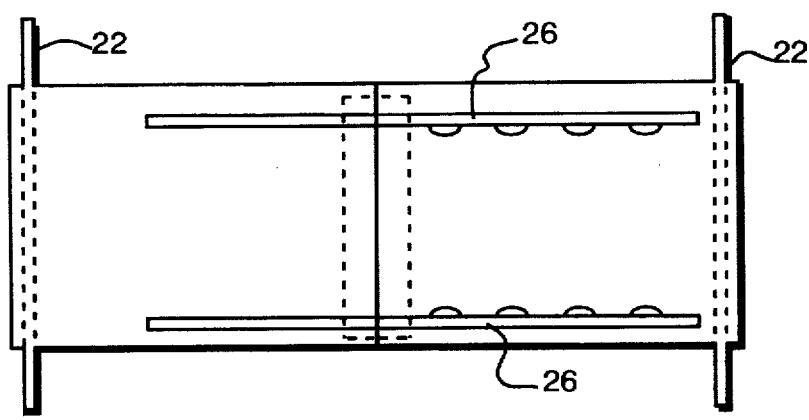
Figure 5C:
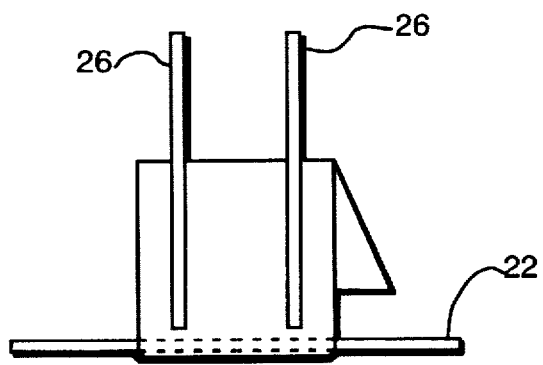

Now referring to FIGS. 5A–5C, the details of hinged bottom shelf 20 are discussed. Shelf 20 is used to support the 26 pound battery pack 50. By positioning battery pack 50 in this location, the additional weight adds stability to stand 11. Two substantially identical rectangular sections 27 of aluminum plate (10 by 11 inches for the 13 inch stand ) are fastened together with piano hinge 25 which is welded to sections 27. On the opposite side, rods 26 are welded to one section 27 and rods 22 are welded to both ends of the respective section 27 as shown. In this manner, when legs 18 are moved toward legs 28, shelf 20 collapses so that the stand 11 can be folded compactly.

The parts of stand 11 can be finished in a variety of methods well known in the art. The preferred finish is powder coat as it is the most durable, however, painting or dipping could also be utilized.

Referring to FIGS. 6 and 7, the details of battery pack 50 will be discussed. As noted above, battery pack 50 which contains sealed lead acid battery 80 is heavier than the remaining part of the unit. Therefore, by making the battery pack removable, the each part is more easily carried than would be the case if battery pack 50 were integrated into stand 11. Tongue and groove case 62 is preferably manufactured from impact and weather resistant materials such as ABS plastic. Cover 64 is provided with an O-ring seal 65 so that water resistant sealing is assured. Cover 64 is removable if desired. Handle 68 enables battery pack 50 to be easily carried. Mounting plate 63 holds the various components within case 62. While various cases could be used, Model SDB-1-35 as manufactured by MTM Molder Products Company of Dayton, Ohio 45413, is preferable.

Battery 80 is preferably Model No. PS-12260 as manufactured by the Power Sonic Corporation of Redwood City, Calif. 94063. Battery 80 is a sealed construction which allows trouble-free operation in any position.

Battery charger 86 is preferably Model #PSC-122000A also manufactured by Power Sonic Corporation. This unit is an automatic dual rate charger that senses battery requirements and automatically switches from the fast charge condition (2 amperes) to a float charge condition (milliampere), thereby combining the advantages of cycle and float chargers. Battery 80 will be safe from overcharge even when plugged in for months. As an added safety feature, cover 64 is open whenever the battery is being charged.

Under normal expected operating conditions, it is anticipated that four or five years of service can be expected or between 20 and 1,000 charge/discharge cycles depending on the depth of discharge.

To ensure obtaining the maximum number of charge/discharge cycles, the battery 80 is prevented from discharging below 11.1 volts by use of low disconnect board 82, Model No. LVCO2-1 as manufactured by Xenotronix of Longwood, Fla. 32752. The use of board 82 prevents catastrophic discharge. If the load on the battery is cut-off when battery 80 reaches only 20% of its capacity, then battery life can be extended up to fifty times than otherwise would be the situation.

Voltage indicator 54 enables a user to obtain the current status of the battery. Preferably, indicator 54 is Coral #13010 as manufactured by Faria Instruments of Uncasville, Conn. 06382. Indicator 54, once activated by switch 60, read from empty to full, by quarters. To charge, a user merely inserts plug 58 which is attached to cord 56 into a standard 110 outlet and battery pack 50 will be charged. Battery pack 50 may be left plugged into a 110 source when not being used, so that battery 80 will always be ready for use when required.

A 10 amp circuit breaker 84 prevents low voltage disconnect board 82 from being overloaded. Circuit Breaker 84 is preferably model 30055-10 as manufactured by Cole Hersee Company of South Boston, Mass. 02127. Power outlet 52 is a female receptacle to which plug 92 is connected. Plug 92 and retractable cord 79 are preferably Model #SAFCO 50 as made by SAFCO Corporation of Chicago, Ill. 60631. This unit has a protective fuse in plug 92 that prevents overload of strobe 12.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A barricade for providing a warning when a potentially hazardous condition is present, said barricade comprising:
   a) a stand comprising:
      a substantially rectangular top shelf having four corners;
      four substantially identical legs, wherein each leg is pivotally attached to one of said corners of said shelf;
      a foldable shelf having an open position and a closed position, said foldable shelf further having two substantially identical sections connected by a hinge, said foldable shelf pivotally connected to said legs, such that when said shelf is in the open position, said stand is self-supporting in an A-frame type of configuration, and when said shelf is in the closed position, said stand may be transported to another location;
      a strobe light having an electrical connection;
      a telescoping assembly slidably attached between said top shelf and said strobe light such that said strobe light may be raised above said top shelf by pulling on said strobe light to improve the visibility of said strobe light, said telescoping assembly comprising a single sleeve that is rigidly attached to said top shelf and a single post rigidly attached to said strobe light and slidably attached to said sleeve;
      a sign, rigidly connected to one pair of legs of said stand; and
   b) a battery pack, connectable to said stand via an electrical connection, said battery pack comprising:
      a lead acid battery capable of storing an electrical charge, said battery adapted for providing electrical power to said strobe light;
      a battery charger connected to said battery for recharging said battery once battery has been discharged from supplying electrical power to said strobe light;
      an outlet for providing electrical power from said battery to said strobe light via the electrical connection of said strobe light;
      a low voltage disconnect board connected between said outlet and said battery, wherein said disconnect board disconnects said battery from said outlet, once the voltage of said battery drops below a predetermined value;

wherein when said stand is in the open position and said battery pack is electrically connected to said strobe light via the electrical connection connected to said outlet, said sign is capable of displaying a warning message and said strobe light is able to provide a flashing warning light at substantial distances, thus enabling said barricade to provide the warning that the potentially hazardous condition is present; and when said stand is in the closed position and said battery pack is disconnected from said outlet, said stand and said battery pack can be separately transported to a new location.

2. The barricade of claim 1 wherein said foldable shelf further comprises at least two support rods connected to only one section of said shelf such that when said shelf is in its open position, said support rods enable said foldable shelf to support said battery pack when said battery pack is connected to said strobe light.

3. The barricade of claim 1 wherein said telescoping assembly further comprises:

a first pipe, having a top end and a bottom end, said top end of said pipe rigidly attached to said strobe light, said first pipe having a stop located adjacent to said bottom end of said pipe, said pipe having a stop; and a second pipe, having a top end and a bottom end, said second pipe rigidly attached to said top shelf, said second pipe having a substantially J-shaped slot in said pipe at the bottom end, such that said first pipe is placed within said second pipe and said stop is within said J-shaped slot, said strobe light can be locked in an uppermost position relative to said top shelf, and such that when said stop is not within said J-slot, said first pipe is free to slidably move within said second pipe to place said strobe light in a lowermost position adjacent to said top shelf.

4. The barricade of claim 1 wherein said battery pack further comprises a circuit breaker, connected between said battery and said low voltage disconnect board, said circuit breaker protects said low voltage disconnect board from an overload.

5. The barricade of claim 4 wherein said battery pack further comprises a state of charge meter that provides information concerning the charge stored within said battery.

6. The barricade of claim 5 wherein said battery charger is an automatic dual rate charger.

7. The barricade of claim 1 wherein said top shelf is fabricated from a single sheet of aluminum.

8. The barricade of claim 7 wherein the sections of said foldable shelf are fabricated from sheets of aluminum.

9. The barricade of claim 8 wherein said legs are substantially square aluminum tubes.

10. The barricade of claim 9 wherein said sign is an aluminum sheet.

11. The barricade of claim 10 wherein said battery pack further comprises a substantially water resistant case having an openable cover that is sealed to the remainder of the case via an O-ring.

12. The barricade of claim 11 wherein the openable cover of said case is removable.

13. The barricade of claim 12 wherein said case is plastic.

* * * * *